(12) United States Patent
Spellman, Jr.

(10) Patent No.: US 7,023,200 B2
(45) Date of Patent: Apr. 4, 2006

(54) NON-CONTACTING LARGE ANGLE ROTARY POSITION SENSOR FOR ROTATING SHAFT

(75) Inventor: Charles A. Spellman, Jr., Yorktown, VA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 166 days.

(21) Appl. No.: 10/386,827

(22) Filed: Mar. 12, 2003

(65) Prior Publication Data

US 2003/0231015 A1 Dec. 18, 2003

Related U.S. Application Data

(60) Provisional application No. 60/389,586, filed on Jun. 18, 2002.

(51) Int. Cl.
*G01B 7/30* (2006.01)

(52) U.S. Cl. .............................. 324/207.25; 324/207.2; 324/207.21; 74/10.6

(58) Field of Classification Search ............ 324/207.11, 324/207.24, 207.21, 207.2, 207.25, 207.22; 74/491, 512, 513, 504, 10.6, 63, 497
See application file for complete search history.

(56) References Cited

U.S. PATENT DOCUMENTS

| | | | |
|---|---|---|---|
| 2,739,249 A | 3/1956 | O'Gorman et al. ............ 310/15 |
| 3,438,271 A * | 4/1969 | Cain ........................... 74/10.6 |
| 3,731,386 A | 5/1973 | Kreiensen et al. ............ 33/1 PT |
| 3,891,918 A * | 6/1975 | Ellis ........................ 324/207.16 |
| 4,982,106 A | 1/1991 | Castellanet et al. .......... 307/120 |
| 6,445,178 B1 * | 9/2002 | Hoekstra ................ 324/207.12 |
| 6,536,389 B1 * | 3/2003 | Shelby et al. ............. 123/90.15 |
| 6,561,303 B1 * | 5/2003 | Pierce et al. ................. 180/336 |
| 6,771,065 B1 * | 8/2004 | Pointer ..................... 324/207.2 |
| 2002/0097044 A1* | 7/2002 | Tateishi et al. ......... 324/207.21 |
| 2003/0169034 A1* | 9/2003 | Okumura ................ 324/207.21 |

FOREIGN PATENT DOCUMENTS

DE 197 10 574 A1 3/1997

OTHER PUBLICATIONS

European Search Report, Application No. EP 03 07 6804, date of completion, Sep. 12, 2003.

* cited by examiner

*Primary Examiner*—Bot Ledynh
*Assistant Examiner*—Kenneth J. Whittington

(57) ABSTRACT

A rotation sensor provides a control with an indication of shaft position. The sensor utilizes a magnetic connection between a cam follower and a transducer. The magnetic connection eliminates problems in the prior art such as degradation due to wear and corrosion. In particular, a rotating shaft carries a cam. The cam drives a cam follower. As the cam follower moves, a magnet moves. The transducer can sense movement of this magnet. In preferred embodiments, the cam follower is driven to pivot and the magnet is mounted on the pivot point of the cam follower. The present invention is disclosed for use in motorcycle throttle handles, accelerator pedals, brake pedals, and detecting shaft position for valve timing.

10 Claims, 2 Drawing Sheets

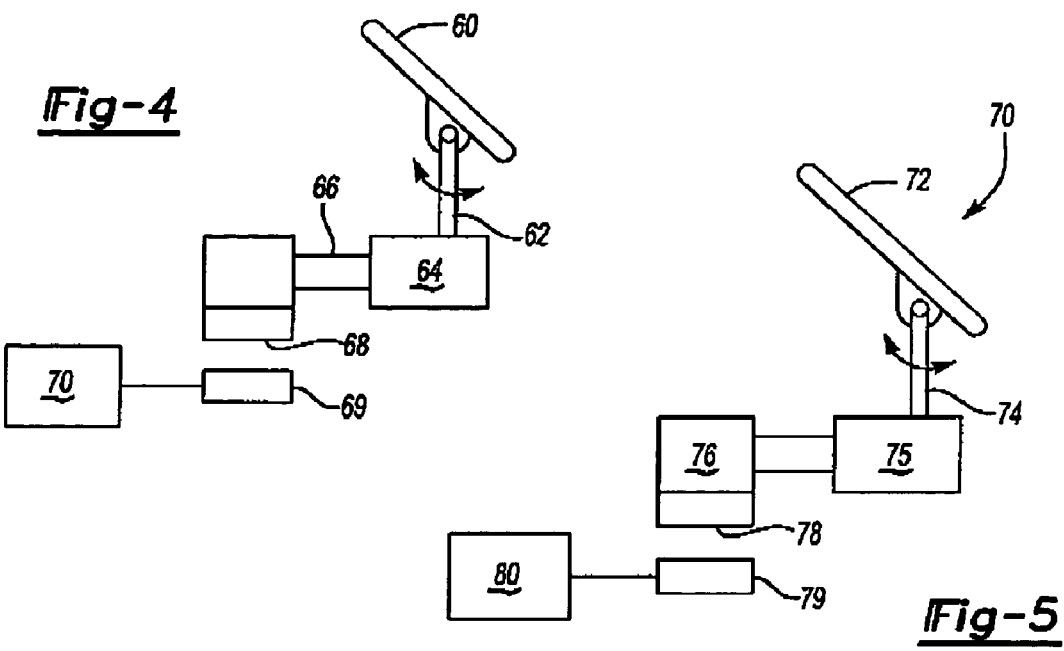
Fig-4
Fig-5
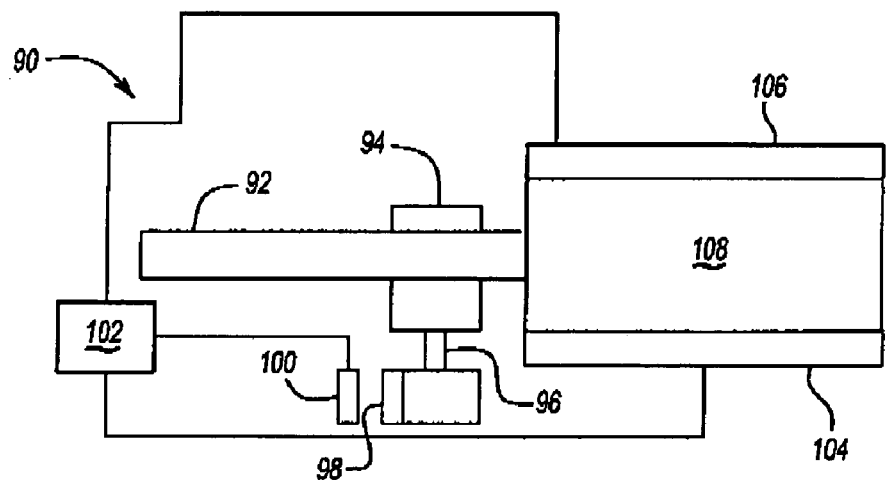
Fig-6
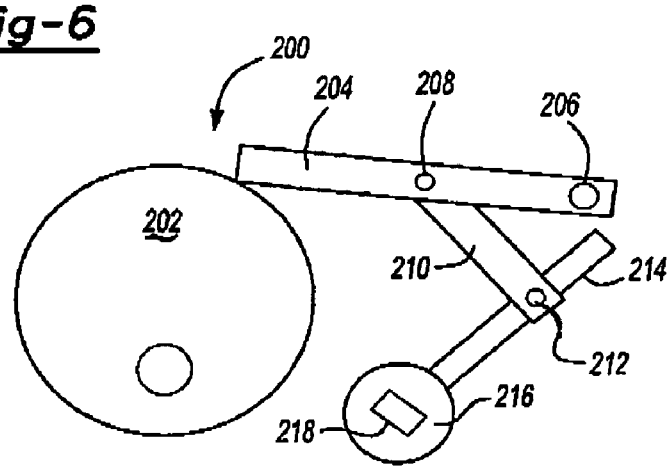
Fig-7

NON-CONTACTING LARGE ANGLE ROTARY POSITION SENSOR FOR ROTATING SHAFT

The present invention claims priority to U.S. Provisional Patent Application Ser. No. 60/389,586 filed on Jun. 18, 2002.

BACKGROUND OF THE INVENTION

This invention relates to a magnetic position sensor that is particularly useful for a rotating control shaft.

Several systems use a rotating shaft to transmit a control input to a controller. As an example, motorcycle throttle handles, accelerator and brake pedals, etc. In each of these systems, an operator inputs a desired control signal through a rotating shaft.

Other type systems provide control feedback by a rotating shaft position. One example is a system for controlling variable valve timing based upon a rotating shaft position.

While historically many of these control signals have been transmitted through a hard connection such as a cable or wire, more recently these signals have been transmitted electrically. As an example, a variable resistance potentiometer has moving fingers that move along conductive traces. The amount of rotation of the control shaft is sensed by the potentiometer that then sends a signal to be interpreted by a control.

One challenge with this type system is that the prior art potentiometers are susceptible to wear and corrosion. With wear and corrosion, the integrity of the signal degrades, which is undesirable.

SUMMARY OF THE INVENTION

In a disclosed embodiment of this invention, a control signal from a input shaft is transmitted to a control by having a magnet which moves with the shaft, and a transducer which senses movement of the magnet. The movement of the magnet is translated into movement of the shaft that is interpreted by the control.

Since the present invention utilizes a magnetic connection, the wear and corrosion problems mentioned above are eliminated.

In preferred embodiments of this invention, the shaft is provided with a cam, and a cam follower moves with the cam as the shaft rotates. A magnet is movable with the cam follower such that as the cam follower moves, the magnet moves. A magnetic transducer senses the amount of movement of this magnet to identify corresponding movement of the shaft.

In a most preferred embodiment of this invention, the cam follower pivots along the cam with the magnet mounted on the pivoting point. The magnet has a cross-section that is not uniform across the circumference of the pivot point such that as the magnet pivots, the transducer can easily identify the amount of movement.

As mentioned above, the present invention is particularly well suited for use in control systems wherein a control shaft is turned to indicate a desire for a particular amount of control, and most preferably in a vehicle control.

Specific examples of applications would be motorcycle throttle handle, accelerator or brake pedals, windshield wipers, etc. Other systems having feedback based upon shaft position such as variable valve timing systems may incorporate this invention.

By controlling the shape of the cam, many different electrical outputs can be designed. As an example, the output could be linear, have a dual slope, etc. The output could also be transcendental, such as relying upon trigonometric logarithm or exponential functions. A worker in the control art would recognize how to achieve a particular output, and why a particular output might be best for a particular situation.

These and other features of the present invention can be best understood from the following specification and drawings, the following of which is a brief description.

BRIEF DESCRIPTION OF THE DRAWINGS

FIG. 4 shows a second application.

FIG. 5 shows yet another application.

FIG. 6 shows yet another application.

FIG. 7 shows a second cam arrangement.

DETAILED DESCRIPTION OF THE PREFERRED EMBODIMENT

Figure 1:
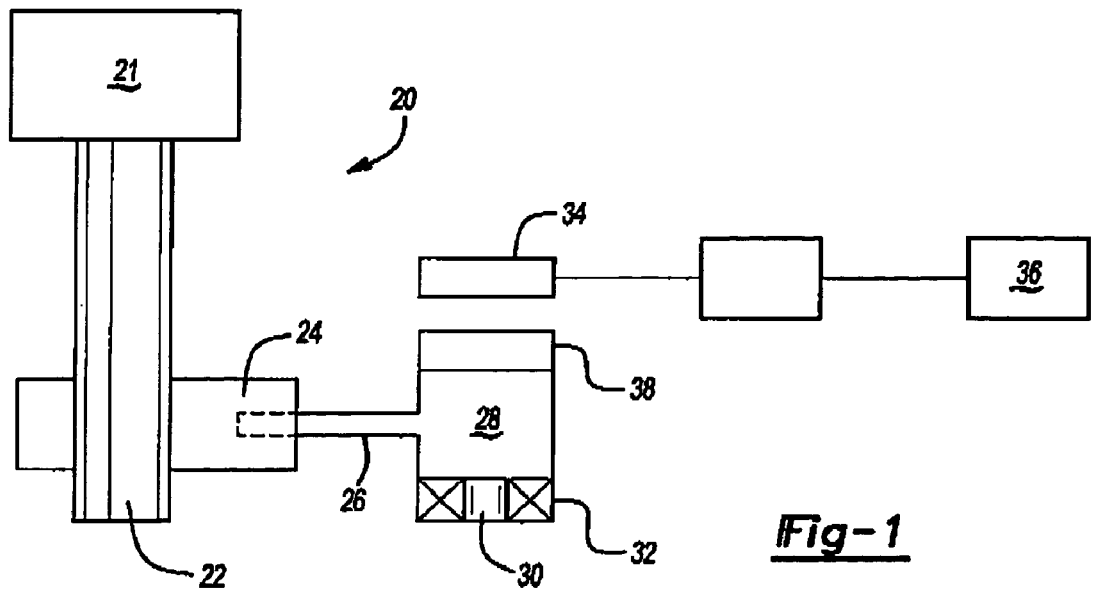
FIG. 1 shows a first schematic embodiment of this invention.

FIG. 1 shows a control system 20 including a component 21 having a control input which in turn rotates a control shaft 22. A cam 24 turns with shaft 22. As cam 24 turns, it drives a pivoting cam 26. As pivoting cam 26 moves along cam 24, it pivots about a pivot point 28. As is shown, the pivot point 28 includes a pin 30 to cantilever mount the pivot point 28 such as in a bearing 32. A magnet 38 is positioned on the pivot point 28 and the movement of the magnet is sensed by a magnetic transducer 34. The magnetic transducer 34 communicates with a control such as an ECU 36.

When an operator wishes to apply a control feature to a system such as an engine incorporating the system 20, a control input is placed an the component. The control input results in a particular amount of rotation of the shaft 22, and that shaft rotation is sensed by the magnetic transducer 34.

Figure 2:
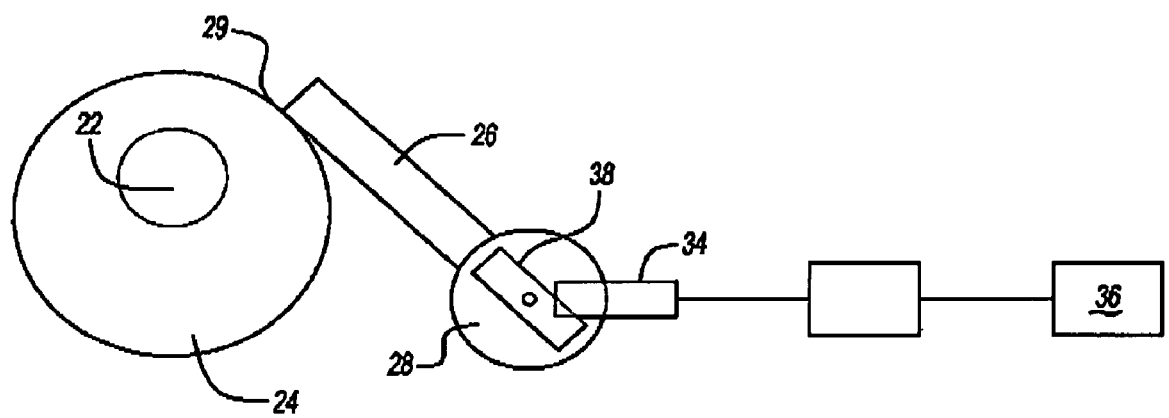
FIG. 2 shows a second view of the FIG. 1 embodiment.

As shown in FIG. 2, shaft 22 has its cam 24 driving the pivoting cam 26. A point 29 rides along the cam 24. As can be appreciated, the magnet 38 has a cross-sectional shape that is distinct from the shape of the pivot point 28. Stated another way, the shape of the magnet 38 varies across the circumference of the pivot point 28. In particular, as illustrated, while the magnet 38 is generally rectangular, while the pivot point 28 is generally circular. Thus, as the pivot point pivots, the amount of magnet 38 facing the transducer 34 changes, and the transducer 34 can easily identify the amount of movement. A worker of ordinary skill in the control art would recognize that the transducer can be designed in combination with the magnet such that the amount of rotation can be easily sensed and measured.

Figure 3:
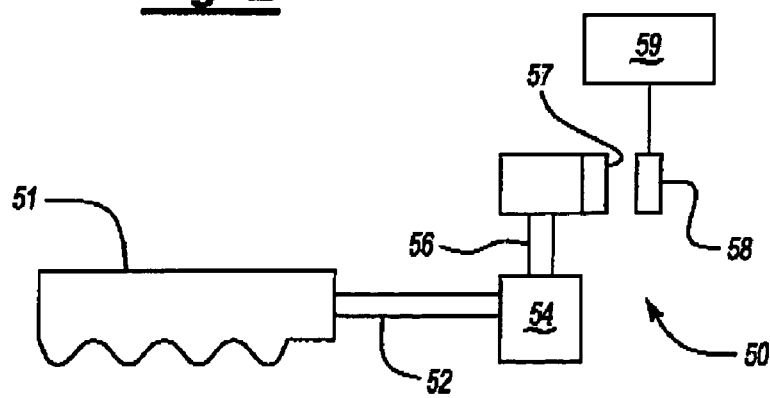
FIG. 3 shows a first application of the inventive system.

FIG. 3 shows an embodiment of this invention 50 wherein the component is a motorcycle throttle handle 51 input driving a shaft 52. The shaft 52 in turn has its cam 54 driving a cam follower 56. The transducer 58 senses rotation of a magnet 57 and communicates with the control 59.

FIG. 4 shows another embodiment wherein the component is a brake pedal 60. Brake pedal 60 includes a control shaft 62 having a cam 64 driving a cam follower 66. Again, the magnet 68 will be sensed by a transducer 69 communicating with a control 70.

FIG. 5 shows another embodiment 70 wherein the input 72 is an accelerator pedal. Again, the shaft 74 includes a cam 75 driving a cam follower 76. The cam follower 76 moves with the magnet 78. The movement of the magnet 78 is sensed by the transducer 79 that communicates with the control 80.

FIG. 6 discloses yet another embodiment wherein the component is a valve train 90. As known, an engine drive shaft 92 has an eccentric cam 94. By sensing the position of shaft 92, cam follower 96 and magnet 98, the transducer 100 can communicate position to control 102. Control 102 can open and close valves 104 and 106 for an engine 108 in proper timing.

As is known, when the control senses the amount of rotation of the shaft, the control can effect a desired change on a system. As an example, with the motorcycle throttle handle, or accelerator pedal, a given amount of shaft rotation is an indication of a desire for a particular amount of fuel into an associated engine. Similarly, the amount of rotation of the brake pedal shaft is an indication of how much braking force is to be exerted. The variable valve timing system of FIG. 6 allows the control to achieve proper opening and closing of the input and output valves for the various cylinders on the engine of FIG. 6.

As shown in FIG. 7, a system 200 includes a shaft having an eccentric cam 202 driving a first grounded pivot link 204 which pivots about a point 206 on a static structure. The link 204 is further pinned at 208 to a second link 210 that is in turn pinned at 212 to yet another link 214. Link 214 is driven to pivot as the link 204 pivots such that the portion 216 turns or pivots. A magnet 218 will move, and its movement can be read as in the prior embodiments. This multi-link cam follower allows even more freedom in selecting the control output that will be associated with a particular degree of movement of the shaft.

In one application, a KMA 200 magnetic transducer is utilized as the transducer.

While the above-disclosed embodiments disclose presently envisioned embodiments of this invention, a worker of ordinary skill in this art would recognize that many modifications would come within the scope of this invention. For that reason, the following claims should be studied to determine the true scope and content of this invention.

What is claimed is:

1. A control system comprising:
    a shaft being driven to rotate to supply input for a desired feature, said shaft having a cam, said cam having an outer peripheral surface for driving a cam follower;
    a magnet moving with said cam follower; and
    a magnetic transducer for sensing movement of said magnet as said cam follower is driven by said cam, said transducer communicating with a control to associate movement of said magnet with the corresponding movement of said shaft and effect a control change for an associated system, said shaft including a control input for a component, said control input receiving an input from a user of a system associated with said component, and said control system effecting a change in said component based upon said user input.

2. A system as set forth in claim 1, wherein said cam follower is driven to pivot.

3. A system as set forth in claim 2, wherein said magnet is mounted on a pivoting point of said cam follower.

4. A system as set forth in claim 3, wherein said magnet has a non-circular shape about said pivot point.

5. A system as set forth in claim 1, wherein said cam follower includes a plurality of linkages.

6. A method of sensing a control input comprising the steps of:
    (1) providing a control input member, said control input member taking a control input from an operator and translating that control input to a predetermined amount of rotation of a shaft, said shaft being provided wit a cam, and said cam having an outer peripheral surface for driving a cam follower, a magnet moving with said cam follower;
    (2) providing a transducer for sensing movement of said magnet; and
    (3) providing a control input to drive said shaft through a predetermined amount of rotation, and sensing resultant movement of said magnet at said transducer, said transducer sending a signal to a control and said control associating movement of said magnet with a predetermined input at said shaft, and effecting a desired control.

7. The method as set forth in claim 6, wherein the operator is a user who is indicating a desired change in a system associated with the control by the amount of the control input.

8. A control system comprising:
    a control shaft being driven to rotate to supply an input from an operator input for a desired control feature, said control shaft having a cam rotating with said control shaft, said cam having an outer peripheral surface for driving a pivoting cam follower;
    a magnet mounted on a pivot point of said cam follower, and said magnet having a cross-sectional shape that varies with respect to said pivot point; and
    a magnetic transducer for sensing movement of said magnet as said cam follower is driven to pivot by said cam, said transducer communicating with a control to associate movement of said magnet with corresponding movement of said control shaft and effect a given amount of control for an associated system.

9. A control system as set forth in claim 8, wherein said cam follower includes a plurality of linkages.

10. A control system as set forth in claim 8, wherein said operator input is taken from a user of the associated system and represents a desired change for the associated system.

* * * * *